B. R. CORLEY.
ENGRAVING MACHINE.
APPLICATION FILED MAY 14, 1917.

1,318,267.

Patented Oct. 7, 1919.
4 SHEETS—SHEET 3.

WITNESSES

INVENTOR
B. R. Corley
BY
ATTORNEYS

B. R. CORLEY.
ENGRAVING MACHINE.
APPLICATION FILED MAY 14, 1917.

1,318,267.

Patented Oct. 7, 1919.
4 SHEETS—SHEET 4.

WITNESSES

INVENTOR
B. R. Corley
BY
ATTORNEYS

UNITED STATES PATENT OFFICE.

BENJAMIN R. CORLEY, OF BROOKLYN, NEW YORK.

ENGRAVING-MACHINE.

1,318,267.  Specification of Letters Patent.  Patented Oct. 7, 1919.

Application filed May 14, 1917. Serial No. 168,483.

*To all whom it may concern:*

Be it known that I, BENJAMIN R. CORLEY, a citizen of the United States, and a resident of the city of New York, borough of Brooklyn, in the county of Kings and State of New York, have invented a new and Improved Engraving-Machine, of which the following is a full, clear, and exact description.

The invention relates to machines, such as shown and described in the Letters Patent of the United States for an etching machine, No. 1,039,713 granted to William S. Eaton, October 1, 1912.

The object of the invention is to provide a new and improved attachment for such types of machine whereby the operator is enabled to accurately space letters, numerals, signs or other characters irrespective of their width and shape.

In order to accomplish the desired result, the work bed, carrying a coated plate, is mounted to slide sidewise under the engraving needle and a spacing device is connected with the said work bed to shift the latter sidewise. Use is also made of a master plate or pattern provided with letters of the alphabet or other characters, and positioning marks one associated with each character at the transverse center thereof to permit of properly positioning each character relative to the stylus of the transmitter. Use is also made of two complementary charts having horizontal spaces on which indicates the pointer of the spacing device, sundry of the spaces being provided with characters according to their width, each space representing a predetermined spacing unit on the plate to be engraved.

A practical embodiment of the invention is represented in the accompanying drawings forming a part of this specification, in which similar characters of reference indicate corresponding parts in all the views.

The engraving machine is mounted on a table 20 on which is erected a column 21 supporting at its upper end a support 22 provided with longitudinally extending guideways 23 engaged by balls 24 on which rest bars 25 forming part of the under side of the work bed 26 provided with the usual auxiliary bed 27 on which rests the coated plate 28 to be engraved by the needle 30. By the arrangement described, the work bed 26 can be readily moved in a sidewise direction. The needle 30 is attached to the front end of the needle support 31 pivoted at its rear end at 32 on a post 33 mounted on the carriage 34 provided at its under side with the usual cups 35 resting on balls 36 held in cups 37 mounted or formed on a bracket 38 attached to the column 21. The needle support 31 is normally held in an uppermost position by a lifting bar 40 which when lowered allows the point of the needle 30 to engage the coated surface of the plate 28. The lifting bar 40 is provided with a stem 41 pressed on by a spring 42 to normally hold the lifting bar 40 in uppermost position, and the stem 41 is connected with the usual treadle mechanism 42 under the control of the operator to move the lifting bar 40 downward whenever it is desired to engage the point of the needle 30 with the coated surface of the plate 28.

Figure 4:
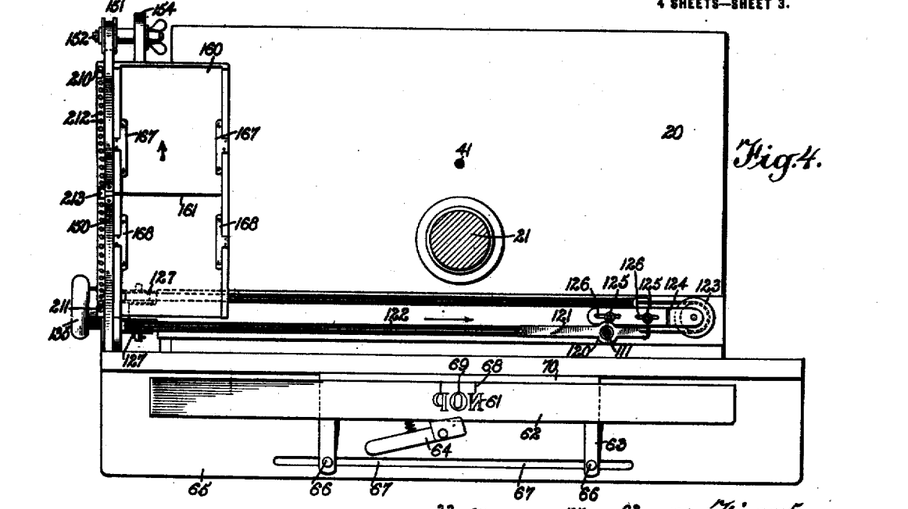
Fig. 4 is a sectional plan view of the lower portion of the engraving machine, the section being on the line 4—4 of Fig. 1.

The lateral movement of the carriage 34 and consequently that of the needle 30 is controlled by a transmitter 50 having a universal joint connection 51 with the carriage and being hung on a universal pivot 52 mounted on a bracket 53 secured to a sleeve 54 slidable up and down on the column 21, the up and down movement being controlled by the operator by the use of a pinion 55 and a rack 56. The lower end of the transmitter 50 carries a stylus 60 adapted to trace letters of the alphabet, numerals or other characters 61 formed on the master plate 62 mounted to slide sidewise in a plate holder 63 provided with a clamping lever 64 for locking the master plate temporarily in place in the holder 63, that is, during the time the stylus is moved along the outlines of the characters 61 to be engraved at the time by the needle 30 on the plate 28. The plate holder 63 is supported on an auxiliary table 65 attached to the table 20 and the holder 63 is sidewise adjustable on the auxiliary table 65 by the use of clamping screws 66 extending in a longitudinal slot 67 formed on the auxiliary table 65. Each character 61 on the master plate 62 has associated therewith a positioning mark 68 extending transversely at the transverse middle of the character, as plainly indicated in Fig. 4, and each positioning mark 68 is adapted to register with a mark 69 produced on the top of the rear ledge 70 of the plate holder 63 and against which ledge abuts the rear edge of the master plate 62, as will be readily understood by reference to Figs. 2 and 4. The mark 69 is preferably located in a vertical transverse plane containing the axis of the transmitter 50 at the time the latter is in a vertical position.

Figures 5, 6, 7, 8:
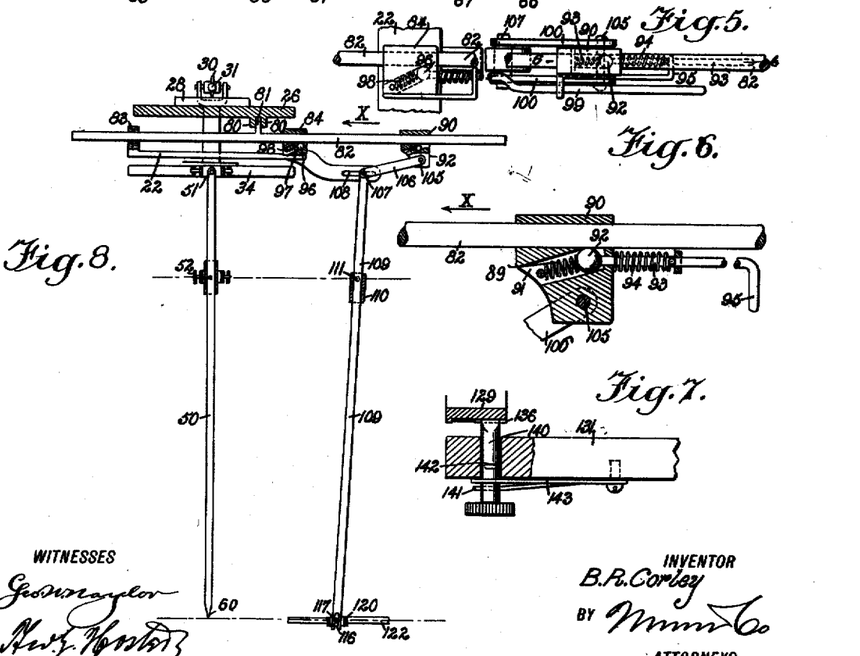
Fig. 5 is a plan view of a portion of the shifting mechanism for the work bed.
Fig. 6 is an enlarged sectional side elevation of the same on the line 6—6 of Fig. 5.
Fig. 7 is an enlarged sectional side elevation of the locking device for the band pulley of the spacing device.
Fig. 8 is a view partly in section of the work bed, the carriage for the needle holder, the transmitter for the carriage, and the shifting and locking device for the work bed.

In order to shift the work bed 26 according to the width of any individual character to be engraved on the plate 28, use is made of a spacing device arranged as follows: The under side of the work bed 26 is provided with spaced transverse lugs 80 between which extends a pin 81 (see Figs. 2 and 8) held on a shifting rod 82, mounted to slide sidewise in bearings 83 and 84 forming part of the support 22. On the rod 82 is mounted a gripping head 90 provided with an opening 91 extending at an angle to the axis of the shifting rod 82 and in the opening 91 is held a ball 92 pressed on by a spring 89 to engage the ball with the rod 82 to clamp the head 90 to the shifting rod 82 with a view to move the rod 82 in the direction of the arrow x on imparting a movement to the gripping head 90 in this direction. During the return movement of the gripping head 90 in the inverse direction of the arrow x the shifting rod 82 will remain at a standstill while the ball 92 travels on the rod 82. The ball 92 is adapted to be moved into release position relative to the shifting rod 82 by the use of a release rod 93 mounted to slide in suitable bearings arranged on the head 90. The release rod 93 is pressed on by a spring 94 to normally hold the same in outermost position to allow the ball 92 to grip the shifting rod 82, as previously explained. The outer end of the release rod 93 is provided with a handle 95 under the control of the operator for pushing the release rod 93 from the right to the left to disengage the ball 92 from the shifting rod 82 whenever it is desired to quickly return the work bed 26. In order to hold the shifting rod 82 against accidental return movement during the return movement of the work bed 26, use is made of another gripping ball 96 mounted in an inclined opening 97 formed in the bearing 84, previously mentioned, and the ball 96 is pressed on by a spring 98 to hold the ball in firm contact with the shifting rod 82 for locking the latter against return movement. A spring-pressed rod 99, similar to the releasing rod 93, is adapted to engage the ball 96 to move the latter out of gripping engagement with the shifting rod 82 whenever it is desired to shift the latter and the work bed 26 by hand from the left to the right.

The under side of the gripping head 90 is provided with a transverse pivot 105 engaged by one end of links 106 provided at their other end with a pivot 107 engaging a longitudinal guideway 108 attached to or formed on the support 22. The pivot 107 is engaged by the upper end of a shifting lever 109 slidably engaging a bearing 110 provided with a transverse pivot 111 mounted to turn in a bearing 112 adjustably fastened in an up and down direction by a screw 113 to a bracket 114 attached to or forming part of the sleeve 54. The screw 113 is adapted to engage one of a vertical row of apertures 115 in the bracket 114 to raise or lower the pivot 111 to correspond with any vertical adjustment that is made in the universal joint 52 in the bracket 53. The lower end of the shifting lever 109 is provided with a fork 116 engaging a transverse pin 117 attached to a bearing 120 formed in a link 121 forming part of an endless band 122 passing around a pulley 123 journaled in a bracket 124 adjustably secured by bolts 125 to the top of the table 20. The bolts 125 extend through slots 126 formed in the bracket 124 to allow of adjusting the bracket to keep the endless band 122 taut. The endless band also passes around guide pulleys 127 journaled on the left hand side of the table 20 and the band then passes around the hub 128 of a wheel 129 having its shaft 130 journaled in a bracket 131 attached to this end of the table 20. A pin 132 engages the portion of the band passing around the bottom of the hub 128 so that when the wheel 129 is turned a positive traveling motion is given to the endless band 122 to impart a sidewise swinging movement to the lever 109 which by the link 106 imparts movement to the gripping head 90. It is understood that when the wheel 129 is turned in one direction and motion is imparted to the gripping head 90 in the direction of the arrow $x$ then the shifting rod 82 is moved in this direction and with it the work bed 26, and when the wheel 129 is turned in the opposite direction then the gripping head 90 is moved in the inverse direction of the arrow $x$ and the shifting rod 82 is held against movement while the head 90 slides on the shifting rod 82. The wheel 129 is provided with a suitable knob 135 to permit the operator to conveniently turn the wheel 129 in either direction. The peripheral face of the wheel 129 is provided in its lower portion with equally spaced notches 136 adapted to be engaged by the upper sharp edge of a pin 140 mounted to slide vertically in the bracket 131. The pin 140 is provided with two spaced notches 141 and 142 adapted to be engaged by a spring 143 attached to the bracket 131. When the spring 143 engages the notch 141 then the pin 140 is in engagement with the notched peripheral face of the wheel 129 to hold the latter in whatever position it is turned in, by the operator turning the knob 135. When it is desired to turn the wheel 129 unrestricted by the locking pin 140 then the latter is pulled downward until the spring 143 engages the notch 142 to hold the pin out of engagement with the notched face of the wheel 129.

Around the wheel 129 extends an endless band or belt 150 fastened at its bottom to the wheel to impart a positive traveling motion to the belt on turning the wheel 129. The belt 150 also passes around a wheel 151 journaled on a stud 152 adjustably secured in a slot 153 formed in a bracket 154 attached to the table 20. The upper run of the belt 150 passes over a table 160 attached to or forming part of an extension 154 of the bracket 131, and the said table is inclined rearwardly and upwardly to be within convenient view of the operator usually seated in the front of the machine. On the upper run of the belt 150 is secured a sidewise extending pointer 161 adapted to indicate on two charts 165 and 166 removably held on the face of the table 160. Spring clips 167, 168 overlie the side margins of the charts 165, 166 to hold the same against accidental displacement while in position on the table 160. The charts 165, 166 are provided with horizontal spaces 170, 171 containing letters of the alphabet, punctuation signs or other characters 172 and 173 arranged according to their width, that is, characters of the same width are arranged in one space and characters of another width are arranged in another space. The characters 172 on the chart 165 are arranged in the spaces according to their width, beginning with the lowest space for the narrowest characters and with the upper spaces spaced for the widest letter. In a like manner the characters 173 are arranged in the space 171, beginning with the narrowest characters on the uppermost space and with the widest characters on the lowermost space. The charts 165 and 166 are held spaced apart more or less according to the spaces to be given to the adjacent characters of the matter to be engraved. When the pointer 161 stands intermediate the adjacent lower and upper edges of the charts 165 and 166 then it is in zero position. The characters 172 and 173 correspond in style and width to the characters 61 on the master plate 62, and it is understood that with master plates having characters 61 of different styles corresponding charts 165 and 166 are used and provided with corresponding characters 172 and 173.

In order to enable the operator to properly center the matter to be engraved on the plate 28 according to the master plate 62 and the charts 165 and 166, use is made of a scale 180 attached to the front of the forward guideway 23 of the support 22. The scale 180 is provided near its upper margin with a linear graduation 181 (see Figs. 9 and 10) representing inches, subdivided in ten parts, with zero at the right-hand side of the graduation 181. Near the lower margin of the scale 180 is arranged a second linear graduation 182, scaled 1 to 2 relative to the graduation 181, with the zero mark (0) opposite the 5-inch mark on the graduation 181 and with the scaled or proportioned inches extending to the right and the left in consecutive order. On the graduations 181 and 182 indicate two pointers 183 and 184 attached to or forming part of an arm 185 secured to the front guideway 25 of the work bed 26 so that the pointers 183 and 184 move with the latter. It is understood that the pointers 183 and 184 are arranged in vertical alinement with each other, and when the pointer 183 indicates at zero of the graduation 181 the pointer 184 indicates on the 10-inch mark of the right-hand portion of the graduation 182. When the pointer 183 is at the 5-inch mark of the graduation 181 then the pointer 184 is at the zero mark of the graduation 182. The said pointers are now in vertical alinement with the needle 30, the axis of the transmitter 50 and the mark 69 on the auxiliary bed 65 (see Fig. 1).

Figure 2:
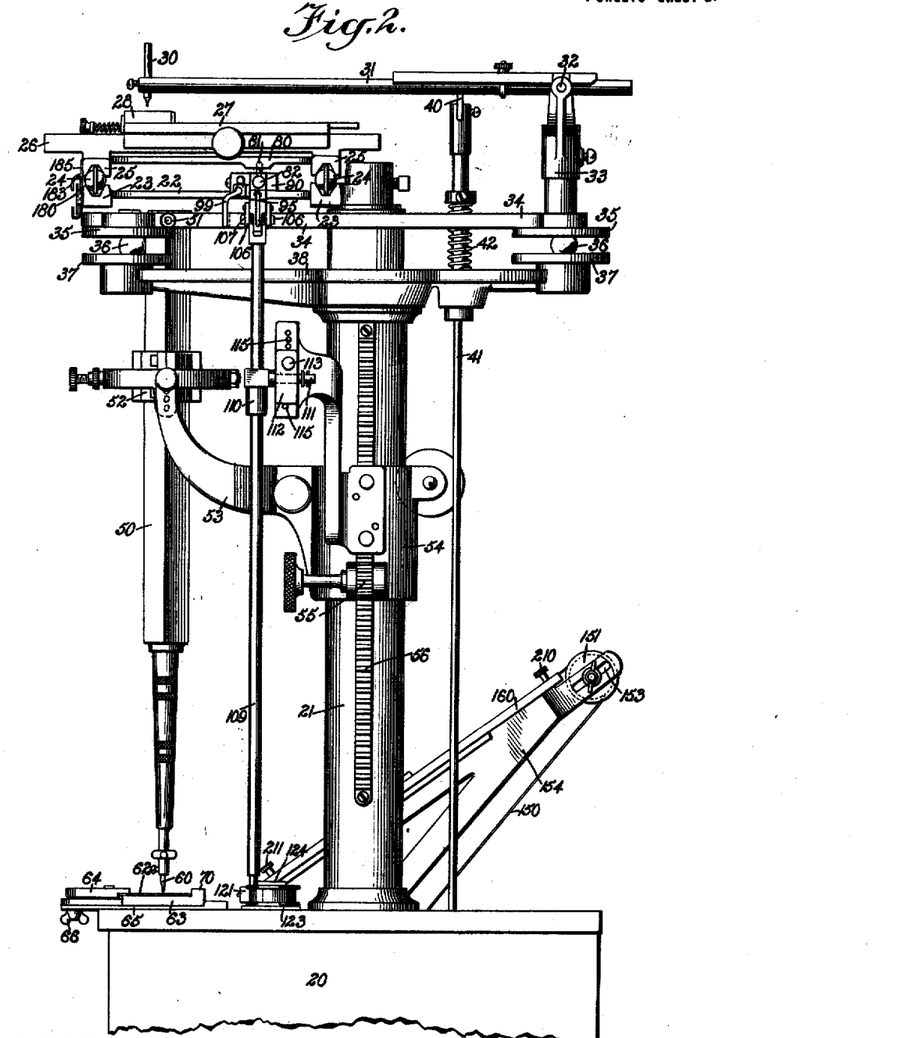
Fig. 2 is a side elevation of the same.

By reference to Fig. 2, it will be noticed that the axis of the pivot 107 is in a horizontal plane extending through the axis of the universal connecting joint 51 connecting the transmitter 50 with the carriage 34, and the axis of the pivot 111 is in the same horizontal plane as the axis of the universal joint 52 hung in the bracket 53. When the universal joint 52 is shifted in the bracket 53, a corresponding adjustment is made of the screw 113 in the bracket 114 to maintain the above described relation between the axis of the pivot 111 and that of the universal joint 52. The axis of the pin 117 is in the same horizontal plane as the point of the stylus 60. By the arrangement described the sidewise movement of the stylus on any one character 61 is proportionate to that given by the shifting lever 109 to the work bed 26 and is according to the spacing distance laid out on the charts relative to the corresponding character, so that the character engraved on the coated plate corresponds in width to the shifting movement given to the work bed at the time.

Figures 1, 3:
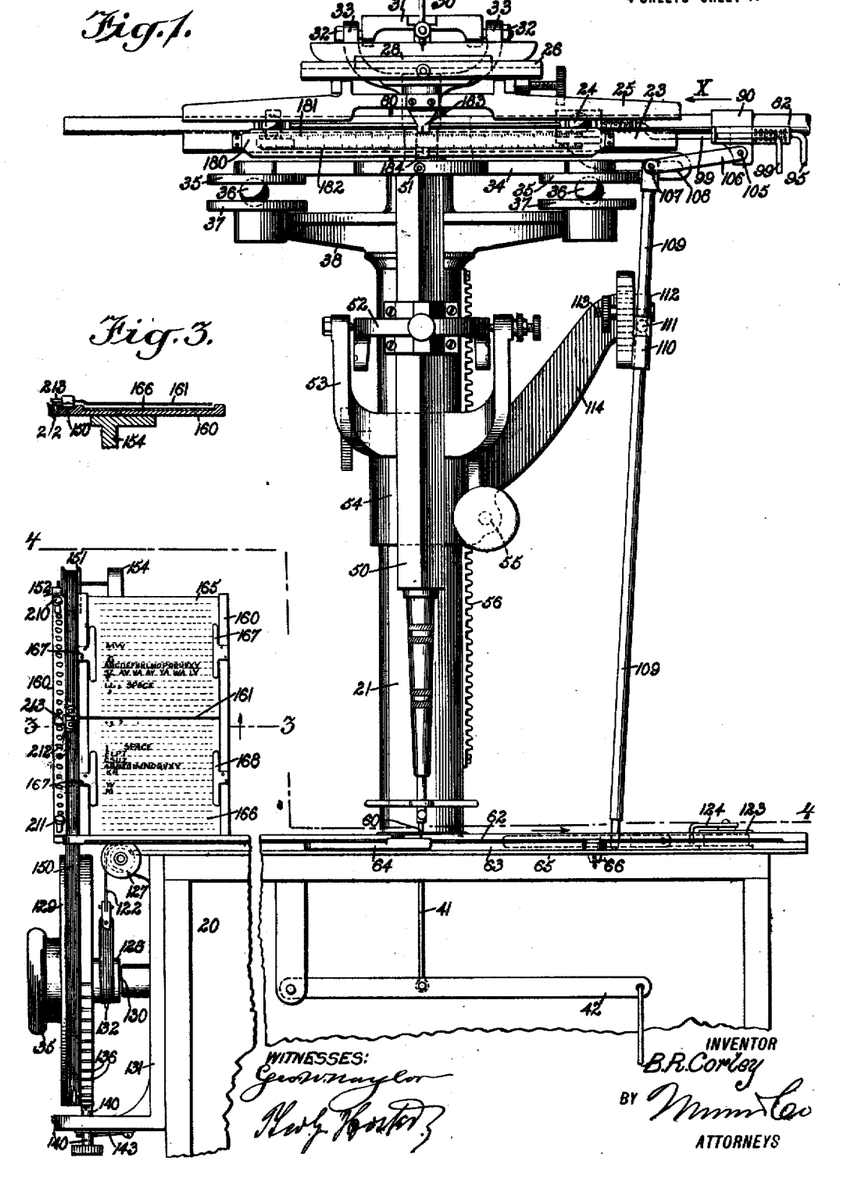
Figure 1 is a front elevation of the engraving machine.
Fig. 3 is a sectional front elevation of a portion of the spacing device, the section being on the line 3—3 of Fig. 1.
Figure 9:
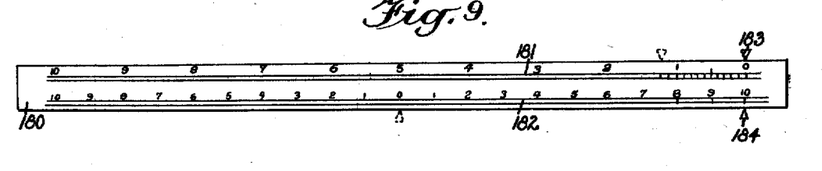
Fig. 9 is an enlarged front elevation of the scale attached to the fixed support or guideway on which the work bed is mounted to slide sidewise.
Figure 10:
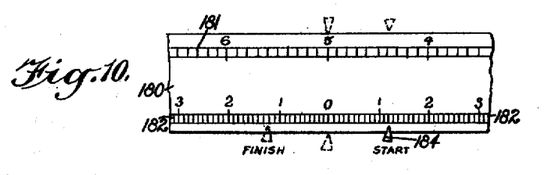
Fig. 10 is an enlarged face view of a portion of the scale with the pointers thereof in a different position from that shown in Fig. 9.
Figures 11, 12, 13:
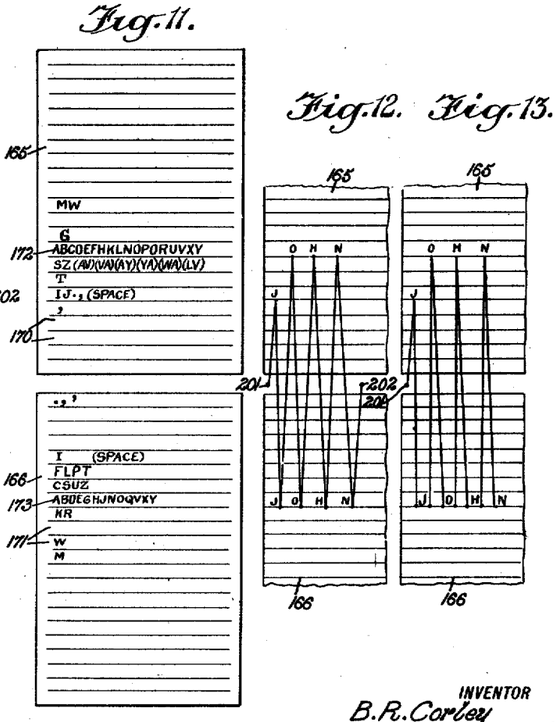
Fig. 11 is a plan view of the upper and lower charts.
Fig. 12 is a diagrammatic view illustrating the working of the spacing device on a given example.
Fig. 13 is a similar view of the same at another stage of the operation of the machine.

The operation is as follows:

Presuming that the several parts are in the position illustrated in Figs. 1 and 2 and it is desired to engrave the word "JOHN" centrally on the coated plate 28, then the operator first moves the work bed 26 to the right until the pointers 183 and 184 register with zero and 10 of the graduations 181, 182, as indicated in Fig. 9. The pointer 161 of the spacing device is in zero position, that is, between the adjacent lower and upper edges of the charts 165 and 166, and this starting position is represented by an imaginary starting mark 201 (see Figs. 12, 13 and 14). The operator next turns the knob 135 to move the pointer 161 upward on the chart 165 until the pointer registers with the space containing the letter "J" which in the chart shown in Fig. 11 is the sixth space from the bottom of the chart. During this upward movement of the pointer 161 a swinging movement is given to the shifting lever 109 by the movement of the band 122 driven from the hub 128 of the wheel 129. The swinging movement given to the shifting lever 109 is transmitted by the link 106 to the gripping head 90 whereby the shifting rod 82 is moved from the right to the left in the direction of the arrow $x$ a proportionate distance relative to the movement of the pointer 161 from zero position to the space containing the letter "J" in the chart 165. The operator next turns the knob 135 in the opposite direction to move the pointer 161 down until it reaches the space containing the letter "J" of the chart 166. During this downward movement the lever 109 is swung in the opposite direction from that previously described and consequently the gripping head 90 is caused to slide freely from the left to the right on the shifting rod 82 without moving the latter as the shifting rod 82 is held locked by the ball 96. The operator next turns the knob 135 to move the pointer 161 up on the chart 165 until it registers with the space on the chart 165 containing the next letter "O." During this movement of the pointer 161 the work bed 26 is again shifted from the right to the left by the action of the shifting lever 109 and the gripping head 90, and then the knob 135 is turned in the opposite direction to move the pointer 161 downward until it registers with the letter "O" on the chart 166. During this downward movement of the work bed 26 remains at a standstill while the gripping head 90 is again moved freely from the left to the right of the shifting rod 82 without moving the latter. The above described operation is repeated for the several letters contained in the word "JOHN," as will be readily understood by reference to Figs. 12 and 14, the pointer 161 being returned to zero after it had been in register with the letter "N" on the lower chart 166. It is understood that during the repeated movement of the work bed 26 from the right to the left, the pointers 183 and 184 have been moved with it, and the pointer 183 now indicates, on the graduation 181, 1.2 inch which corresponds to the space between the starting mark 201 and the finish mark 202, shown in Fig. 14. The operator next moves the work bed 26 and its rod 82 to the left until the pointers 183 and 184 are in central position on the scale 180, that is, with the pointer 184 in register with zero of the graduation 182. The coated plate 28 is now shifted on the section 27 of the work bed 26 and locked in place thereon, with the point of the needle 30 above the transverse middle of the word to be engraved. The operator next presses the releasing rods 93 and 99 to the left to release the work bed 26 and its rod 82 to allow shifting of the work bed 26 with the plate 28 locked thereto to the right until the pointer 184 registers with the twelfth mark on the graduation 182, as indicated in Fig. 10. It is understood that as this graduation 182 is 1 to 2 relative to the graduation 181 the shifting of the work bed 26 to the right to the twelve points mentioned on the graduation 182 divides the space from the starting point 201 to the finish mark 202 into equal parts; that is, the bed 26 has been shifted one-half the length of the word "JOHN" to be copied on the plate 28. The operator now turns the knob 135

Figure 14:
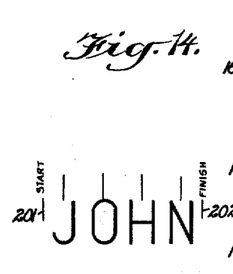
Fig. 14 is a diagrammatic view illustrating the positioning marks relative to a given example.

135 to move the pointer 161 up on the chart 165 to the letter "J" whereby the work bed 26 is shifted from the right to the left a distance corresponding to the distance from the starting point 201 to the middle of the letter "J" (see Fig. 14). The operator now takes hold of the master plate 62 and shifts the same sidewise until the center mark 68 of the letter "J" registers with the mark 69, and then the operator takes hold of the transmitter 50 and with the stylus 60 traces the letter "J" while holding the treadle mechanism 42 pressed so that the point of the needle 30 is in engagement with the coated surface of the plate 28. When the letter "J" has been traced the operator releases the treadle 42 to allow the needle 30 to rise out of engagement with the coated plate 28. The operator next turns the knob 135 to move the pointer 161 down to the letter "J" on the chart 166 and then turns the knob 135 in the opposite direction to cause the pointer 161 to travel upward until it registers with the letter "O" on the chart 165. During this upward movement of the pointer 161 the work bed 26 is shifted a distance corresponding to the distance between the center lines of the letters "J" and "O" (see Fig. 14). The operator now again shifts the master plate 62 until the center line 68 of the letter "O" is in register with the mark 69, and then the operator takes hold of the transmitter 50 and traces with the stylus 60 the letter "O" while the treadle mechanism is pressed to cause the needle 30 to engrave the letter "O" in the coated surface of the plate 28. When this has been done, the treadle mechanism is released to raise the needle 30. The operator now turns the knob 135 to move the pointer 161 downward until it registers with the letter "O" on the chart 166 and then turns the knob 135 in the opposite direction to move the pointer 161 upward until it registers with the letter "H" on the chart 165. During this movement the work bed 26 is again shifted from the right to the left a distance corresponding to that between the center lines of the letters "O" and "H." The master plate 62 is shifted until the center line 68 of the letter "H" registers with the mark 69, then the operator manipulates the transmitter 50 to trace this letter with the stylus 60 and while the treadle mechanism is depressed to cause the needle 30 to inscribe the letter "H" in the coated surface of the plate 28. The above described operation is repeated for the next letter "N," and the pointer 161 is returned to zero position, and when this has been done the pointer 184 registers with the mark 1.2 on the graduation 182 to the left of the zero mark thereof, as indicated in Fig. 10. From the foregoing it will be seen that by the arrangement described absolutely accurate spacing of the characters is obtained irrespective of their shape and width, and the words are engraved accurately on the predetermined spaces on the plate 28 by the use of the spacing device above set forth.

In case it is desired to engrave scrolls, borders or the like, then use is made of two stop pins 210 and 211 adapted to be inserted in a row of apertures 212 formed on the table 160 adjacent the upper run of the belt 150. The upper run of the belt 150 in alinement with the pointer 161 is provided with a stop lug 213 extending in the path of the pins 210, 211 to limit the upward and downward movement of the band 150 and consequently the swinging movement of the shifting lever 109. By inserting the pins 210, 211 nearer to or farther from the zero position of the pointer 161, less or more swinging movement can be given to the shifting lever 109 according to the width of the scroll to be engraved. It is understood that in this case the charts 165 and 166 are not used as the stop pins 210 and 211 in conjunction with lug 213 perform the function of the charts 165 and 166 and the pointer 161.

Having thus described my invention, I claim as new and desire to secure by Letters Patent:—

1. In an engraving machine of the class described, a work bed adapted to support a coated plate, a needle support carrying a needle adapted to act on the coated surface of the said plate and a spacing device having a locking and releasing device connecting the said spacing device with the said work bed, the said locking and releasing device having means to lock the spacing device to the work bed on shifting the spacing device in one direction, the said means releasing the work bed on shifting the spacing device in the opposite direction to allow the work bed to remain at a standstill.

2. In an engraving machine of the class described, a needle support carrying a needle, a work bed adapted to support a coated plate to be acted on by the said needle, a fixed support on which the said work bed is mounted to slide sidewise, a carriage carrying the said needle support, manually controlled means imparting motion to the said carriage, a spacing device connected with the said work bed to shift the latter sidewise, a scale fixed on the said support and having an upper and a lower linear graduation, one of double the value of the other, and two pointers fixed on the said work bed and in vertical alinement with each other, the pointers indicating on the said graduations.

3. In an engraving machine of the class described, a fixed support, a work bed adapted to support a coated plate and mounted to slide sidewise on the said support, a rod mounted to slide on the said support and engaging the said work bed to shift the latter sidewise, a clutch for moving the said rod sidewise in one direction and adapted to release the rod on the return movement, a lever connected with the said clutch to move the latter alternately in an opposite direction, spacing charts, a pointer adapted to indicate on the said charts, and actuating means connected with the said lever and the said pointer to oscillate the said lever and to shift the said pointer.

4. In an engraving machine of the class described, a fixed support, a work bed adapted to support a coated plate and mounted to slide sidewise on the said support, a rod mounted to slide on the said support and engaging the said work bed to shift the latter sidewise, a clutch for moving the said rod in one direction and adapted to release the rod on the return movement, a lever connected with the said clutch to move the latter alternately in an opposite direction, spacing charts, a pointer adapted to indicate on the said charts, an endless band carrying the said pointer, wheels around which passes the said endless band, one of the wheels being adapted to be turned by hand, and a second endless band connected with one of the said wheels and connected with the said lever to actuate the latter.

5. In an engraving machine of the class described, a chart provided with characters arranged in spaced lines, the characters in a line being of approximately the same width.

6. In an engraving machine of the class described, a chart provided with characters arranged in spaced lines, the characters in a line being of approximately the same width and the lines being arranged in succession according to the gradually increasing width of the characters.

7. In an engraving machine of the class described, a work bed, manually controlled actuating means for imparting a predetermined irregular step by step movement to the said work bed in one direction, a pointer controlled by the said actuating means, and spacing charts, each provided with characters arranged in spaced lines, the characters in a line being of approximately the same width and the lines being arranged in succession according to the gradually increasing width of the characters, the said pointer indicating on the said character.

8. In an engraving machine of the class described, a master plate provided with characters, and center marks, one associated with each character at the transverse center line of the character.

9. In an engraving machine of the class described, a master plate provided with letters of the alphabet and center marks, one associated with each letter at the transverse center line of the letter, and a holder on which the said master plate is mounted to slide sidewise, the holder having a mark adapted to register with each center mark on shifting the master plate sidewise.

10. In an engraving machine of the class described, a master plate provided with letters of the alphabet and center marks, one associated with each letter at the transverse center line of the letter, a holder on which the said master plate is mounted to slide sidewise, the holder having a mark adapted to register with each center mark on shifting the master plate sidewise, a universal pivot, a support for the said universal pivot, a transmitter mounted on the said universal pivot and having a stylus registering with the said holder mark at the time the transmitter is in an approximately vertical position, a carriage movable by the action of the said transmitter, a work bed adapted to support a coated plate, a needle adapted to engrave the said coated plate, and a needle support carrying the said needle and mounted on the said carriage.

11. In an engraving machine of the class described, a master plate provided with letters of the alphabet and center marks, one associated with each letter at the transverse center line of the letter, a holder on which the said master plate is mounted to slide sidewise, the holder having a mark adapted to register with each center mark on shifting the master plate sidewise, a universal pivot, a support for the said universal pivot, a transmitter mounted on the said universal pivot and having a stylus registering with the said holder mark at the time the transmitter is in an approximately vertical position, a carriage movable by the action of the said transmitter, a needle, a needle support carrying the needle and mounted on the said carriage, a work bed adapted to carry a coated plate to be engraved by the said needle, a support on which the said work bed is mounted to slide sidewise, a scale plate attached to the said support and provided with a linear graduation having a zero mark in vertical alinement with the said holder mark.

12. In an engraving machine of the class described, a master plate provided with letters of the alphabet and center marks, one associated with each letter at the transverse center line of the letter, a holder on which the said master plate is mounted to slide sidewise, the holder having a mark adapted to register with each center mark on shifting the master plate sidewise, a universal pivot, a support for the said universal pivot, a transmitter hung on the said universal pivot and having a stylus registering with the said holder mark at the time the transmitter is in an approximately vertical position, a carriage movable by the action of the said transmitter, a needle, a needle support carrying the needle and mounted on the said carriage, a work bed adapted to carry a coated plate to be engraved by the said needle, a support on which the said work bed is mounted to slide sidewise, a scale plate attached to the said support and provided with a linear graduation having a zero mark adapted to register with the said holder mark, the said scale plate having a second linear graduation parallel with the said first-named graduation and twice as large, and two pointers indicating on the said graduations and moving with the said shiftable work bed.

BENJAMIN R. CORLEY.

Copies of this patent may be obtained for five cents each, by addressing the "Commissioner of Patents, Washington, D. C."